US008335877B2

(12) United States Patent
Bondurant et al.

(10) Patent No.: US 8,335,877 B2
(45) Date of Patent: *Dec. 18, 2012

(54) HARDWARE ACCELERATION OF COMMONALITY FACTORING ON REMOVABLE MEDIA (75) Inventors: Matthew D. Bondurant, Superior, CO (US); Steven W. Scroggs, Louisville, CO (US)

(73) Assignee: Imation Corp., Oakdale, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/243,188

(22) Filed: Sep. 23, 2011

(65) Prior Publication Data
US 2012/0079198 A1  Mar. 29, 2012

Related U.S. Application Data (63) Continuation of application No. 12/167,867, filed on Jul. 3, 2008, now Pat. No. 8,028,106.

(60) Provisional application No. 60/948,387, filed on Jul. 6, 2007, provisional application No. 60/948,394, filed on Jul. 6, 2007.

(51) Int. Cl.
G06F 13/12 (2006.01)

(52) U.S. Cl. .............. 710/68; 710/62; 710/65; 710/74

(58) Field of Classification Search .................. None
See application file for complete search history.

(56) References Cited

U.S. PATENT DOCUMENTS

| 5,990,810 | A | 11/1999 | Williams |
| 6,704,730 | B2 | 3/2004 | Moulton et al. |
| 6,810,398 | B2 | 10/2004 | Moulton |
| 7,065,619 | B1 | 6/2006 | Zhu et al. |
| 7,137,011 | B1 | 11/2006 | Harari et al. |
| 7,197,189 | B2 | 3/2007 | Adelmann |
| 7,403,451 | B2 | 7/2008 | Goodman et al. |
| 7,533,323 | B2 | 5/2009 | Alaimo et al. |
| 7,834,784 | B1 | 11/2010 | Zhang et al. |
| 2004/0233910 | A1* | 11/2004 | Chen et al. ................. 370/395.5 |
| 2006/0059207 | A1 | 3/2006 | Hirsch et al. |
| 2007/0097534 | A1 | 5/2007 | Evans |
| 2007/0208788 | A1 | 9/2007 | Chakravarty et al. |
| 2008/0133536 | A1 | 6/2008 | Bjorner et al. |

(Continued)

OTHER PUBLICATIONS

Broder, Andrei Z., "Some applications of Rabin's fingerprinting method," no date, pp. 1-10.

(Continued)

Primary Examiner — Chun-Kuan Lee
Assistant Examiner — Dayton Lewis-Taylor
(74) Attorney, Agent, or Firm — Kenneth E. Levitt; Dorsey & Whitney LLP (57) ABSTRACT Systems and methods for commonality factoring for storing data on removable storage media that may allow for highly compressed data to be stored efficiently on portable memory devices. The methods include breaking data into unique chunks and calculating identifiers, e.g., hash identifiers, based on the unique chunks. Redundant chunks can be identified by comparing identifiers of other chunks to the identifiers of unique chunks. When a redundant chunk is identified, a reference to the existing unique chunk is generated such that the chunk can be reconstituted in relation to other chunks in order to recreate the original data. One or more of the unique chunks, the identifiers, and/or the references may be stored on the portable memory device. Hardware and/or software for the chunking and/or hashing functions can reside in a host computer, a removable storage device or cartridge, and/or a removable cartridge holder.

20 Claims, 5 Drawing Sheets

U.S. PATENT DOCUMENTS

2009/0013129 A1     1/2009    Bondurant

OTHER PUBLICATIONS

Cox, Landon P. et al. Pastiche: Making Backup Cheap and Easy, Dept. of Electrical Engineering and Computer Science, Univ. of Michigan, Ann Arbor, MI, Proceedings of the $5^{th}$ Symposium on Operating Systems Design and Implementation, Boston, MA, Dec. 9-11, 2002, 14 pages.

Denehy, Timothy E. et al. "Duplicate Management for Reference Data," RJ 10305, Oct. 7, 2003, Computer Science, IBM Research Report, Duplicate Mgmt for Reference Data, pp. 1-14.

Douglis, Fred et al. "Application-specific Delta-encoding via Resemblance Detection," Mar. 31, 2003, 19 pgs.

Karp, Richard M. et al. "Efficient Randomized Pattern-Matching Algorithms," IBM J. Res. Develop., vol. 31, No. 2, Mar. 1987, pp. 249-260.

Korn, David G. et al. "Engineering a Differencing and Compression Data Format," AT&T Laboratories—Research, Proceedings of the 2002 USENIX Annual Technical Conference, Monterey, CA, Jun. 10-15, 2002, pp. 1-10.

Kulkarni, Purushottam et al. "Redundancy Elimination Within Large Collections of Files," Proceedings of the General Track: 2004 USENIX Annual Technical Conference, Boston, MA, Jun. 27-Jul. 2, 2004, 14 pgs.

Moreton, Tim D. et al. "Storage Mutability and Naming in Pasta," Univ. of Cambridge Computer Laboratory, Cambridge, UK, no date, 5 pgs.

Muthitacharoen, Athicha et al. "A low-bandwidth Network File System," MIT Laboratory for Computer Science, Cambridge, MA 02139, USA, no date, 2 pgs.

Policroniades, Calicrates et al. "Alternatives for Detecting Redundancy in Storage Systems Data," Computer Laboratory, Cambridge Univeristy, Proceedings of the General Track: 2004 USENIX Annual Technical Conference, Boston, MA, Jun. 27-Jul. 2, 2004, 14 pgs.

Rabin, Michael O. "Fingerprinting by Random Polynomials," Dept. of Mathematics, the Hebrew University of Jerusalem, no date, 14 pgs.

You, Lawrence L. et al. "Evaluation of Efficient Archival Storage Techniques," no date, pp. 1-6.

\* cited by examiner

HARDWARE ACCELERATION OF COMMONALITY FACTORING ON REMOVABLE MEDIA

This application is a continuation of U.S. patent application Ser. No. 12/167,867 filed Jul. 3, 2008, now issued as U.S. Pat. No. 8,028,106, which claims the benefit of and is a non-provisional of both U.S. Provisional Application Ser. No. 60/948,394 filed on Jul. 6, 2007; and U.S. Provisional Application Ser. No. 60/948,387 filed on Jul. 6, 2007, which are hereby expressly incorporated by reference in their entirety for all purposes.

This application expressly incorporates by reference U.S. application Ser. No. 12/167,872, filed on Jul. 3, 2008, entitled "Commonality Factoring For Removable Media", in its entirety for all purposes.

BACKGROUND OF THE DISCLOSURE

The present invention generally relates to data storage systems and, but not by way of limitation, to data storage systems that store information on removable media.

Conventional backup involves of a series of full, incremental or differential backups that saves multiple copies of identical or slowly changing data. This approach to backup leads to a high level of data redundancy.

For years, there has been a considerable disparity between the prices of tape and disk-based storage systems with tape-based storage being less expensive. Therefore, conventional data storage solutions have been tape based storage systems that compress data using conventional algorithms for an average compression ratio of about 2:1. Advantageously, tape-based storage systems use removable tape cartridges that can be taken to off-site location for disaster recovery. However, the process of recovering data in a tape based storage system is slow, complex and unreliable.

Data de-duplication, known as commonality factoring, is a process of reducing storage needs by eliminating redundant data. Data de-duplication is a disk-based data storage system that greatly reduces disk space requirements. However, disk-based data storage systems including de-duplication methods are not easily exported to removable media. In order to export de-duplicated data to removable media, the de-duplicated data has to be first reformulated to its original form and then be recorded on removable tape cartridges, thereby, requiring more storage space than the de-duplicated version.

Data de-duplication is a resource intensive process, which is implemented in software as part of the commonality factoring solutions. Due to the intensive computational process, top of the line multi-core/multi-processor servers are used to provide adequate performance to perform the de-duplication process. The amount of performance gained by the use of multi-core/multi-processor servers depends on the algorithms used and their implementation in software. However, the overall cost and power consumption of these multi-core/multi-processor servers are high.

SUMMARY

In various embodiments, systems and methods for commonality factoring for storing data on removable storage media are described. The systems and methods allow for highly compressed data, e.g., data compressed using archiving or backup methods including de-duplication, to be stored in an efficient manner on portable memory devices such as removable storage cartridges. The methods include breaking data, e.g., data files for backup, into unique chunks and calculating identifiers, e.g., hash identifiers, based on the unique chunks. Redundant chunks can be identified by calculating identifiers and comparing identifiers of other chunks to the identifiers of unique chunks previously calculated. When a redundant chunk is identified, a reference to the existing unique chunk is generated such that the chunk can be reconstituted in relation to other chunks in order to recreate the original data. The method further includes storing one or more of the unique chunks, the identifiers and/or the references on the removable storage medium.

In some aspects, hardware and/or software can be used to accelerate the commonality factoring process. The acceleration hardware and/or software can reside in multiple devices, depending on the embodiment. For example, hardware and/or software for the chunking and/or hashing functions can reside in one or more of a host computer, a removable storage device, a removable cartridge holder (e.g., a socket) and the removable storage cartridge.

In one embodiment, a system for commonality factoring for storing data with a removable storage cartridge is disclosed. The system includes a processor, an expansion bus coupled to the processor and a socket coupled to the expansion bus. The socket is configured to accept the removable storage cartridge. An expansion module is removably coupled to the expansion bus. The expansion module is configured to transfer data to the removable storage cartridge. The expansion module includes a chunking module and a hashing module. The chunking module is configured to break an original data stream into a number of chunks. The hashing module is coupled to the chunking module in a pipeline fashion such that at least a portion of input to the hashing module comprises output from the chunking module. The hashing module is configured to determine if each chunk is unique, and forward chunks determined to be unique toward the removable storage cartridge.

In another embodiment, a method for commonality factoring for storing data with a removable storage cartridge is disclosed. In one step, at an expansion module removably coupled to a host computer, an original data stream is received. The expansion module includes a chunking module and a hashing module. The hashing module and the chunking module are configured in a pipeline architecture such that at least a portion of input to the hashing module includes output from the chunking module. At the chunking module, the original data stream is broken into a number of chunks. The chunks are forwarded toward the hashing module. The hashing module calculates an identifier for each forwarded chunk; storing the identifiers; and determines, based on the identifiers, whether each chunk is unique. At least one of the unique chunks and the identifier is forwarded to the removable storage cartridge. The removable storage cartridge includes a storage drive.

In yet another embodiment, an expansion card for commonality factoring for storing data with a removable storage cartridge is disclosed. The expansion card includes a chunking module and a hashing module. The chunking module is configured to receive an original data stream from the host computer and break the original data stream into a plurality of chunks. The expansion card is configured to be removably coupled to a host computer and the removable storage cartridge and store data on the removable storage cartridge. The hashing module is coupled to the chunking module in a pipeline fashion such that at least a portion of input to the hashing module comprises output from the chunking module. The hashing module is configured to: receive the plurality of chunks from the chunking module; calculate an identifier for each of the received chunks; determine, based on the identifiers, if each chunk is unique; and store the unique chunks on the removable storage cartridge.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiments of the disclosure. It should be understood that various changes may be made in the function and arrangement of elements without departing from the spirit and scope of the invention as set forth in the appended claims.

This disclosure relates in general to data storage systems used for data backup, restore and archive applications. It specifically relates to a new generation of removable storage cartridges housing a hard disk drive (HDD) as the storage medium. Throughout the specification, HDD may be used to describe the storage medium but it is to be understood that flash memory or a solid state disk (SSD) drive could be used in the alternative.

Embodiments of the present invention are directed to a system for storing more data on a single storage cartridge than the use of the conventional Lempel-Ziv (LZ) compression methods would allow. This is achieved through implementation of commonality factoring (or de-duplication). In particular, the system according to the present invention accelerates the process so that the data reduction is performed at a rate competitive with a Linear Tape Open (LTO) tape drive without requiring a high end server to perform the processing.

According to one embodiment of the present invention, there is provided a system for accelerating commonality factoring for storing data with a storage cartridge. The system includes a chunking module for breaking an original data stream into chunks. In the chunking module, pipelining and table lookups are used for optimization. The system also includes a hashing module for determining if each chunk is unique or a duplicate of any of the previously stored chunks. The first byte of each chunk is processed by the hashing module before the last byte of the chunk has been processed by the chunking module to achieve parallelism.

In this embodiment, the chunking module may comprise a section for Rabin fingerprinting or a section for performing a sliding window checksum. Further, in this embodiment, the hashing module may comprise one or more of a section for Message Digest Algorithm 5 (MD5) hashing, a section for Secure Hash Algorithm-1 (SHA-1) hashing and a section for Secure Hash Algorithm-2 (SHA-2) hashing.

According to another embodiment of the present invention, there is provided another system for accelerating commonality factoring for storing data with a storage cartridge. The system includes the chunking module and the hashing module as above, and further includes an additional data processing module.

In this embodiment, the additional data processing module may comprise one or more of a data compression module, an encryption module and an error correction coding (ECC) module. Furthermore, the data compression module may comprise a section for performing a Lempel-Ziv Stac (LZS) algorithm. Additionally, the encryption module may comprise a section for performing a Triple Data Encryption Standard (3DES) algorithm, an Advanced Encryption Standard-128 (AES-128) algorithm or an Advanced Encryption Standard-256 (AES-256) algorithm.

According to yet another embodiment of the present invention, there is provided yet another system for accelerating commonality factoring for storing data with a storage cartridge. The system includes the chunking module, the hashing module and the additional data processing module as above, and further includes a database search module followed by the additional data processing module for performing a search of the chunk database based on outputs from the hashing module and passing only the unique chunks to the additional processing module. The objective is to reduce bandwidth requirements for the additional data processing module.

According to yet another embodiment of the present invention, there is provided yet another system for accelerating commonality factoring for storing data with a storage cartridge. The system includes the chunking module and associated modules, wherein multiple data paths in parallel are utilized. The objective is to further accelerate the commonality factoring process.

In this embodiment, the multiple data paths may comprise a single data stream split across multiple instances by truncating the data stream at locations that do not necessarily align with chunk boundaries as calculated by the chunking module, wherein the size of the truncated portions of the data stream is either fixed or variable.

Figure 1:
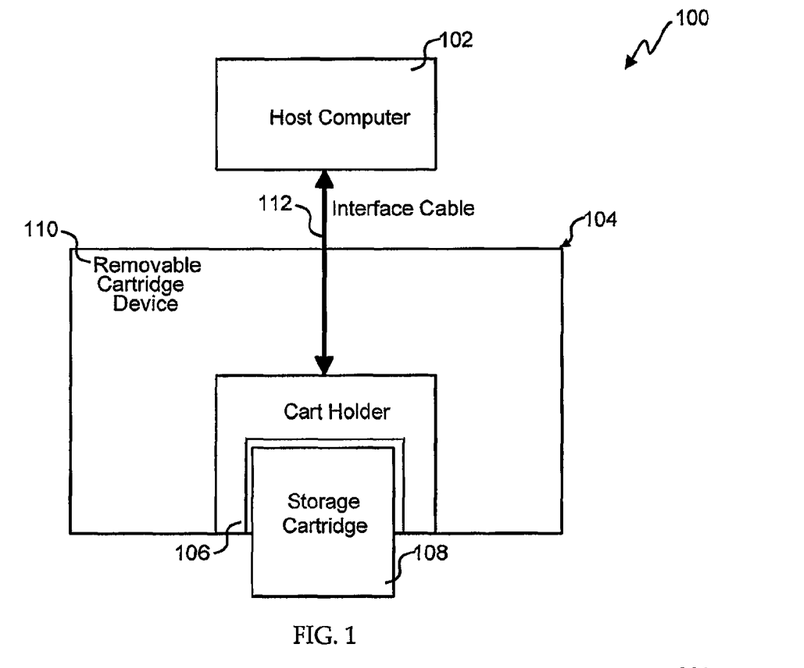
FIG. 1 depicts a block diagram of an embodiment of a data storage system.

Referring first to FIG. 1, an embodiment of a data storage system 100 is shown. The data storage system 100 may include a host computer 102 and a removable drive bay 104. The host computer 102 includes a processor and an expansion bus. The expansion bus is coupled to the processor and is configured to transfer data to the drive bay 104 via standard interface. The removable drive bay 104 may include a removable cartridge device 110 and a removable cartridge holder 106. The host computer 102 may be communicatively coupled with removable cartridge device 110. By way of example, the removable cartridge device 110 interface to the host computer 102 may be any version of Small Computer System interface (SCSI), a Fiber Channel (FC) interface, an Ethernet interface, an Advanced Technology Attachment (ATA) interface, or any other type of interface that allows the removable cartridge device 110 to communicate with the host computer 102. The cartridge holder 106 can be a plastic socket and can physically mount to a circuit board of the removable cartridge device 110. The cartridge holder 106 may further include an eject and lock mechanism. A removable storage cartridge 108 provides storage capability for the data storage system 100, wherein the storage cartridge 108 is removably coupled to the removable cartridge device 110. The portable storage cartridge 108 is also optionally locked in the cartridge holder 106. In an alternative embodiment, the host computer 102 may be communicatively coupled with cartridge holder 106 through an interface cable 112.

As will be described further bellow in various embodiments, the commonality factoring function may be implemented as an expansion module in one or more of the following locations: 1) in the storage cartridge 108, 2) in the removable cartridge device 110 and outside the cartridge holder 106, and 3) in the host computer 102.

As explained above, the present invention identifies duplicate portions in an original data stream which have previously been stored, so that a reference to the data portion can be stored in place of the duplicate portion itself. There are several steps for performing this process as follows: (1) a step of breaking the original data stream into small chunks (data portions) which can be analyzed for redundancy; (2) a step of calculating an identifier for each chunk; (3) a step of determining, by searching a database of the identifiers, if each chunk is unique in that the same chunk has not been found in the previous chunks; and (4) a step of organizing the unique chunks, identifiers and associated metadata so that the original data stream can be regenerated. The original data stream can represent any form of data such as audio, video, textual and can be a plurality of files or objects.

Steps (1) and (2) of the above process are more processor intensive, and appropriate to apply hardware acceleration to. Also, these steps may be combined with other data modification steps such as conventional data compression and encryption as part of the overall data storage process. All of these steps are considered in terms of an integration to provide the maximum system throughput.

Rabin Fingerprinting is a method of breaking the incoming data stream into smaller chunks of data which can be analyzed for redundancy. This method has tractable statistical properties that simpler methods such as a rolling checksum do not exhibit, but any chunking algorithm could be used in various embodiments. This method has been implemented in software as part of the commonality factoring solutions, which may be done in order to accelerate time-to-market for these products at the expense of cost and/or performance. Top-of-the-line multi-core/multi-processor servers are used to provide adequate performance of the software algorithms. Instead of implementing this method in software, one embodiment of the present invention implements this method in a solution that uses hardware, which provides increased performance with lower cost and lower power dissipation. The detail of hardware implementation of Rabin Fingerprinting method in a pipeline fashion is described in U.S. Provisional Patent Application Ser. No. 60/948,394, filed on Jul. 6, 2007. By implementing the hardware in a pipelined fashion, high throughputs can be obtained at reasonable clock rates with minimal logic.

Rabin fingerprinting is fundamentally an operation on polynomials a single-bit at a time in a data stream. Because most systems work well with data aligned to 8-bit byte boundaries, the result of the polynomial operations is only relevant for every eighth bit. Since the intermediate calculations are not considered, we can optimize the calculations by directly calculating the next fingerprint value 8-bits at a time.

Rabin fingerprints are calculated on a sliding window of data, e.g., 48 bytes in a buffer array. For each calculation, the oldest byte in the array is replaced with the newest byte. The first pipeline stage replaces the oldest byte with the newest byte and performs a lookup based on the oldest byte which provides a value that can be used to remove the oldest byte's effect from the fingerprint. The next pipeline stage uses the input to remove the oldest data from the fingerprint and then combines the fingerprint with the new data using another table lookup to generate the new fingerprint. The final pipeline stage determines whether a portion of the new fingerprint matches a predetermined check value used for determining chunk boundaries and verifies that the chunk size fits within a minimum/maximum range.

The output of the chunking step using either Rabin fingerprinting or simpler methods such as a sliding window checksum is a sequence of data called a chunk which can be analyzed to determine if it has previously been stored by the storage system. One way to efficiently determine whether the chunk has been previously stored is to compute a one way function on the data called a hash which allows determination to be made with very high statistical likelihood of whether the data is a duplicate of any of the previously stored data. Many hash algorithms are available for this purpose such as MD5, SHA-1 and the SHA-2 family. The goal is to select an algorithm which has a statistically small enough chance of collisions that it can be assumed that it will not produce false matches. The hash algorithm is resistant to intentional or malicious attempts to cause collisions. The hash algorithm should be secure; MD5 is not truly considered secure and SHA-1 has some potential vulnerabilities, but these vulnerabilities may not apply to some applications. The type of hash algorithm may be chosen depending on the application. Further, the use of multiple hash algorithms is possible in some embodiments.

Figure 2:
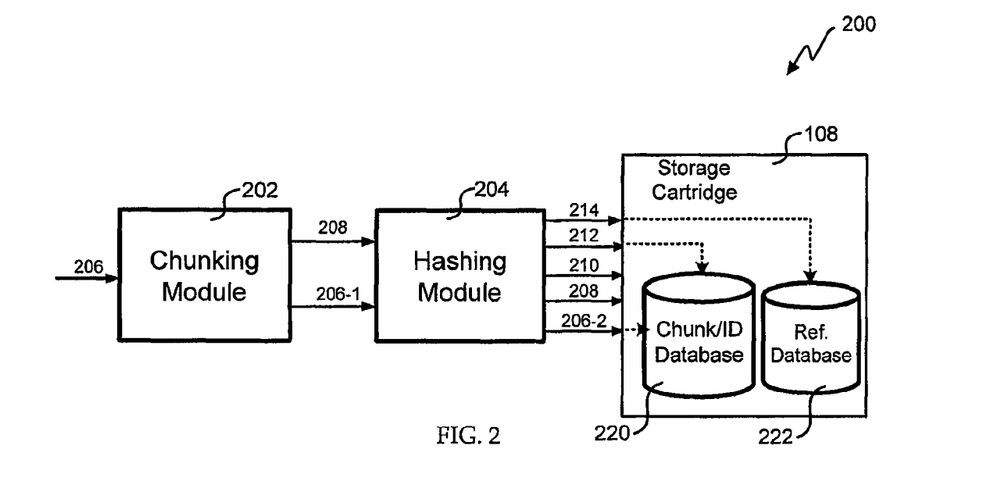
FIG. 2 depicts a block diagram of an embodiment of a system for performing commonality factoring.

Referring next to FIG. 2, a block diagram of an embodiment of a system 200 for performing commonality factoring is shown. The system 200 includes chunking module 202 coupled directly to a hashing module 204. In this embodiment, the chunking module 202 performs the step of breaking the original data stream 206 into small chunks using Rabin fingerprinting algorithm on a sliding window of data stream 206. Other embodiments may use different methods and algorithms such as sliding window checksum. Referring back to the FIG. 1, the original data stream 206 can be provided from different sources depending on the location of the expansion module in various embodiments as discussed below. For example, the host computer 102, the removable cartridge device 110, or the storage cartridge 108 can all forward the original data stream 206 to the chunking module 202 in various embodiments.

The chunking module 202 outputs a sequence of data bytes called chunks 206-1 along with an indication 208 whether a chunk boundary has been reached for each sequence of data bytes. The end of each sequence indication 208 is also referred to as an end-of-record or EOR. This allows the EOR 208 and the data chunks 206-1 to be synchronized as they pass on to the hashing module 204. In this embodiment, the chunking module 202 is coupled to the hashing module 204 in a pipeline fashion such that at least a portion of the input to the hashing module 204 comprises output from the chunking module 202. In one embodiment, the hashing module 204 processes a first byte of each chunk from the sequence of data bytes 206-1 before a last byte of the same chunk is processed by the chunking module 202. Other embodiments may obtain the complete chunk from the chunking module 202 and then run the chunk through the hashing module 204.

The hashing module 204 performs steps of calculating an identifier for each chunk from the sequence of data bytes 206-1, and then determining the uniqueness of the chunk. The determination step can be performed by storing the identifiers into a database and searching the database of identifiers to determine whether each chunk is unique. Where the chunk is found to be unique, the unique chunk and its identifier are stored in a chunk/ID database 220 on the removable storage cartridge 108. Table I shows an example of chunk/ID database 220 where streams of unique chunks and their identifiers are stored on the removable storage cartridge 108.

TABLE I

Example of Unique Chunks and Identifiers Stored in the Chunk/ID Database

| Unique Chunks | Chunk 0 | Chunk 1 | Chunk 2 | ... | Chunk N |
|---|---|---|---|---|---|
| Identifiers | ID 0 | ID 1 | ID 2 | ... | ID N |

If the chunk is not unique, the redundant chunk is discarded and a reference to the existing unique chunk is created such that the redundant chunk can be reconstituted in relation to other chunks in order to regenerate the original data stream 206. The reference to the existing unique chunk is then forwarded to the removable storage cartridge 108 for storage in a reference database 222. An example stream of references stored in the reference database 222 is shown in Table II. Other embodiments may include a separate module for determining chunk uniqueness. The hashing module 204 outputs a stream of unique chunks 206-2, an end-of-record indication 208, a stream of length for each unique chunk 210, a stream of hash values for each unique chunk 212, and a stream of references 214.

TABLE II

Example of References Stored in the References Database

| References | Ref 0 | Ref 1 | Ref 2 | ... | Ref R, R>>N |
|---|---|---|---|---|---|

Figure 3:
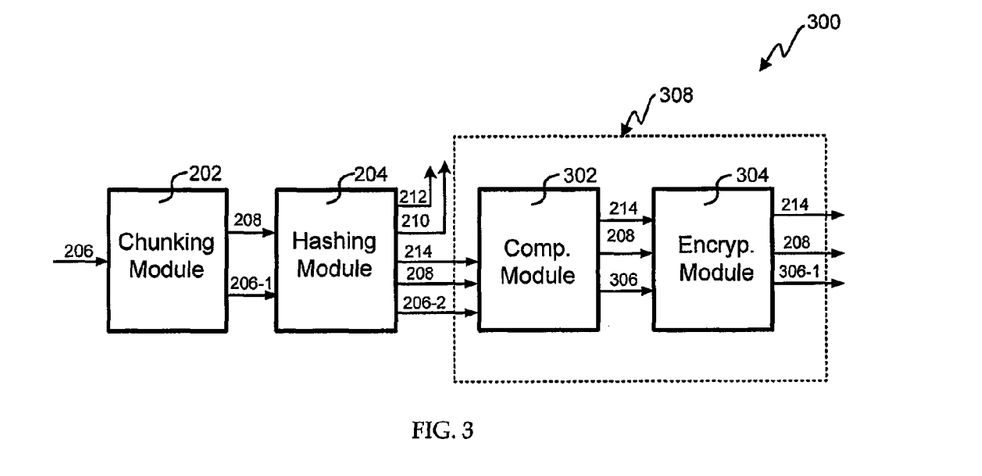
FIG. 3 depicts a block diagram of an alternative embodiment of a system for performing commonality factoring.

With reference to FIG. 3, a block diagram of an alternative embodiment of a system 300 for performing commonality factoring is shown. In the system 300, an additional module 308 for performing data processing is directly coupled to output of the combined chunking and hashing modules 202 and 204. This helps optimize the data flow between modules. The additional data processing module 308 includes a compression module 302 and an encryption module 304. The streams of unique chunks 206-2, references 214, and the end-of-record 208, from the hashing module 204, are sent to compression module 302. The compression module 302 performs conventional data compression of the unique chunks 206-2 using, for example, the Lempel-Ziv Stac (LZS) algorithm.

The compressed unique chunks 306, references 214, and the end-of-record 208 are then sent to encryption module 304. The encryption module 304 may use different algorithms such as a triple data encryption standard (3DES), and an advanced encryption standard-128/256 (AES-128/256). Other embodiments may also include an additional data processing module such as an error correction coding module, e.g., Reed-Solomon. Other outputs from the hashing modules, e.g., the length of unique chunks 210, and hash values 212 can optionally be passed to the compression module 302 and the encryption module 304. This will provide a synchronized output for each module.

A system like the one shown in FIG. 3 has the benefit of reducing bus traffic between the expansion module and the main system memory where the data is probably stored while not being processed. Table III indicates an example of the savings in the bus bandwidth where the LZS compression and commonality factoring each provides about a 2:1 data reduction. In this embodiment, the final output data rate is described as "D".

TABLE III

Example of Reduction in System Bandwidth with integrated Modules

| To Hardware Bandwidth for 4 independent modules | 4D + 4D + 2D + D | 11D |
|---|---|---|
| From Hardware Bandwidth for 4 independent modules | D + D | 2D |
| To Hardware Bandwidth for 2 halves | 4D + 2D | 6D |
| From Hardware Bandwidth for 2 halves | | D |
| To Hardware Bandwidth for full integration | | 4D |
| From Hardware Bandwidth for full integration | | 2D |

As can be seen from the example numbers in Table III, one benefit of full integration is a reduction in bandwidth from system memory to the hardware acceleration modules of almost 3.times. as compared to a non-integrated approach. Also, the full integration provides a better balance in bandwidth than the partially integrated approach, which may be beneficial when using a bi-directional serial interface such as PCI-Express.

Figure 4:
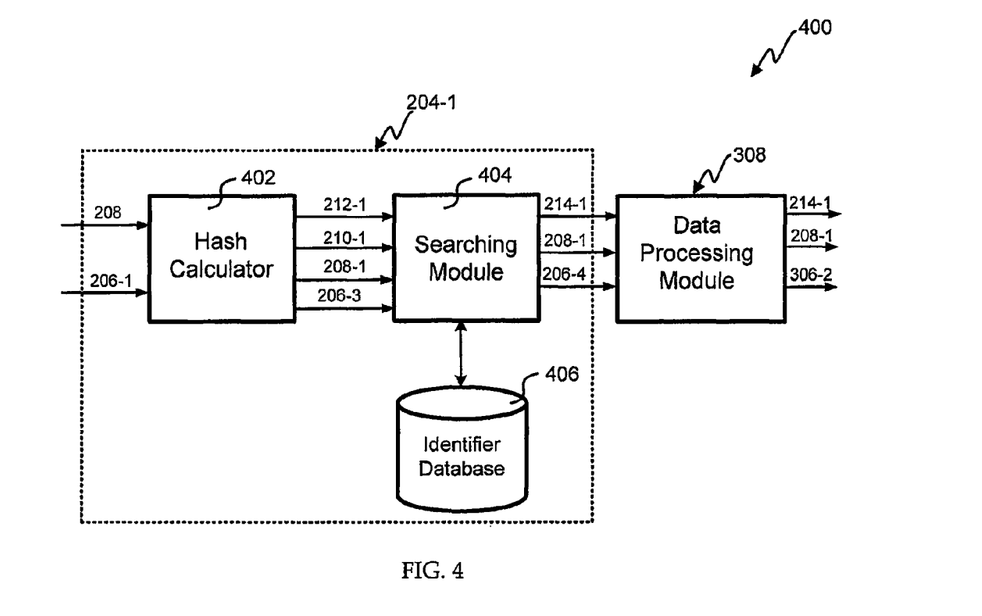
FIG. 4 depicts a block diagram of an alternative embodiment of a system for performing commonality factoring.

Referring now to FIG. 4, a block diagram of another embodiment of a system 400 for performing commonality factoring is shown. The system 400 includes the chunking module 202 (not shown in this figure), a hashing module 204-1, and an additional data processing module 308. The hashing module 204-1 includes a hash calculator 402, a searching module 404 and an identifier database 406. In this embodiment, the hash calculator 402 performs the step of calculating an identifier for each chunk without determining the uniqueness of the chunk. Therefore, the hash calculator 402 outputs a sequence of data chunks 206-3, the end-of-record indication 208-1, the length for each chunk 210-1, and the identifiers for each chunk 212-1. A searching module 404 performs a search of database 406 based on the identifiers 212-1 output from the hash calculator 402 and passes the unique chunks 206-4 to the data processing module 308.

The searching module 404 contains enough buffering to store output data from the hash calculator 402 and determine whether each chunk should be discarded or passed on to the remainder of the data path. By placing the searching module 404 inline in the data stream, the bandwidth requirements for the remainder of the data path can be cut in half assuming that only half of the chunks are unique on average for this embodiment. This can simplify the design of the remaining data processing module 308 and reduce the load on the interface between the expansion module and the rest of the system. The data processing module 308 may include a compression module and an encryption module. Other embodiments may also include an error correction coding module.

In some embodiments, running a single instance of the chunking module 202 at a sufficiently high rate to meet the bandwidth requirements of the system may not be entirely practical. In these cases, it may make sense to instantiate multiple instances of the chunking module 202 and associated modules to create parallel data paths for increasing the total bandwidth, for example, there could be two, three, four, five, six, seven, eight or more parallel data paths in various embodiments. In the case where multiple input data streams 206 are being received and processed, these data streams can simply be mapped to multiple instances of the data path. In the case where a single data stream 206 demands more bandwidth than a single instance can provide, the data stream can be split between multiple instances. The simplest way to do this is to truncate the data stream 206 to one instance as if the end of data has been reached and redirect the data to the other instance.

This solution has the side effect of creating a false chunk boundary at the truncation point. This last chunk is unlikely to match an existing chunk since the chunk boundary was determined using a different method that a similar chunk may have used. This is unlikely to result in a significant difference in the effectiveness of the commonality factoring as long as the truncated portions of the data stream are large relative to the individual chunk size. For example, if the truncated portions are 10 MB and the average chunk size is 8 KB, there will be about 1250 chunks per portion. Only 2 of the chunks (the first and last) are potentially affected by the truncation, so that this would only reduce the effectiveness by about 0.16% in one embodiment.

Figure 5A:
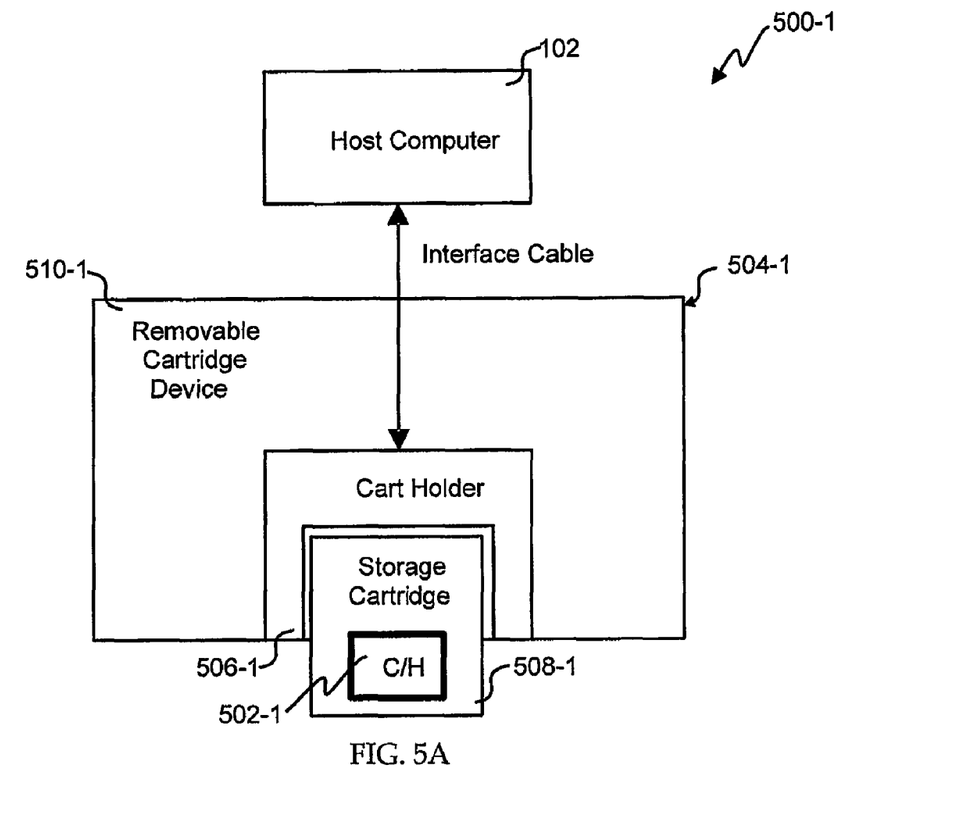
FIGS. 5A, 5B, and 5C illustrate schematic diagrams of alternative embodiments of data storage systems for performing commonality factoring.

Referring next to FIG. 5A, a schematic diagram of an embodiment of a data storage system 500-1 for performing commonality factoring is shown. In this embodiment, the commonality factoring is implemented as an expansion module 502-1 within the storage cartridge 508-1. The expansion module 502-1 is also referred to as a chunking and hashing module (C/H), which represent the primary engine for commonality factoring in this embodiment. The expansion module 502-1 may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. Other embodiments may only include one or more portions of the C/H module in one location and other portions in another location.

The original data stream is first sent form the host computer 102 to the cartridge holder 506-1 via any standard interface such as SCSI (Small Computer System interface), a Serial ATA (Advanced Technology Attachment), a parallel ATA, a SAS (Serial Attached SCSI), Firewire™, Ethernet, UWB, USB, wireless USB, Bluetooth™, WiFi, etc. The cartridge holder 506-1 may include an electrical, optical, and/or wireless interface to exchange data and commands with the storage cartridge 508-1. The interface between the cartridge holder 506-1 and the storage cartridge 508-1 could also use the similar standard interface as above. Thus, storage cartridge 508-1 may be removably coupled to the removable cartridge device 510-1 via cartridge holder 506-1 by mating to the electrical, optical, and/or wireless connector of the cartridge holder 506-1.

In this embodiment, the expansion module 502-1, is incorporated in the removable storage cartridge 508-1 itself, thus giving rise to a self-contained disk-based storage cartridge. Some embodiments may use a processor in the storage cartridge 508-1 to perform the C/H modules. The processor could be inside or outside the hard drive but within the cartridge in any event. In one embodiment, a firmware update to the hard drive allows implementation of the C/H functionality. In another embodiment, the C/H modules are on a circuit card outside the hard drive and within the storage cartridge 508-1.

Figure 5B:
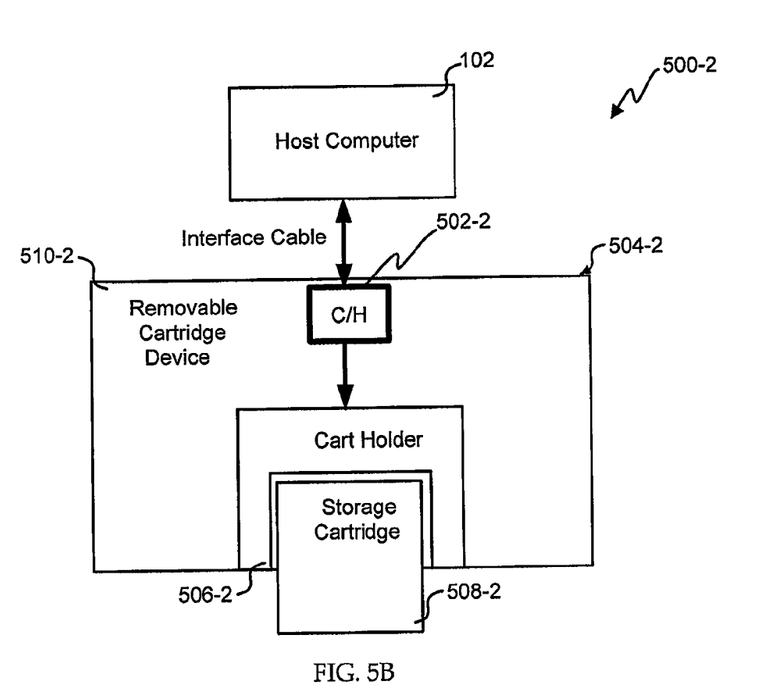

With Reference to FIG. 5B, a schematic diagram shows yet another embodiment of a data storage system 500-2. In this embodiment, the commonality factoring is implemented as an expansion module 502-2 within the removable cartridge device 510-2. The data to be stored on the storage cartridge 508-2 is first sent from the host computer 102 to the removable cartridge device 510-2 via any standard interface as mentioned in the previous embodiments. The original data stream then enters the expansion module 502-2 for processing at the removable cartridge device level. The de-duplicated data is then sent to the storage cartridge 508-2, via the cartridge holder 506-2, through the similar standard interface, as discussed above.

Figure 5C:
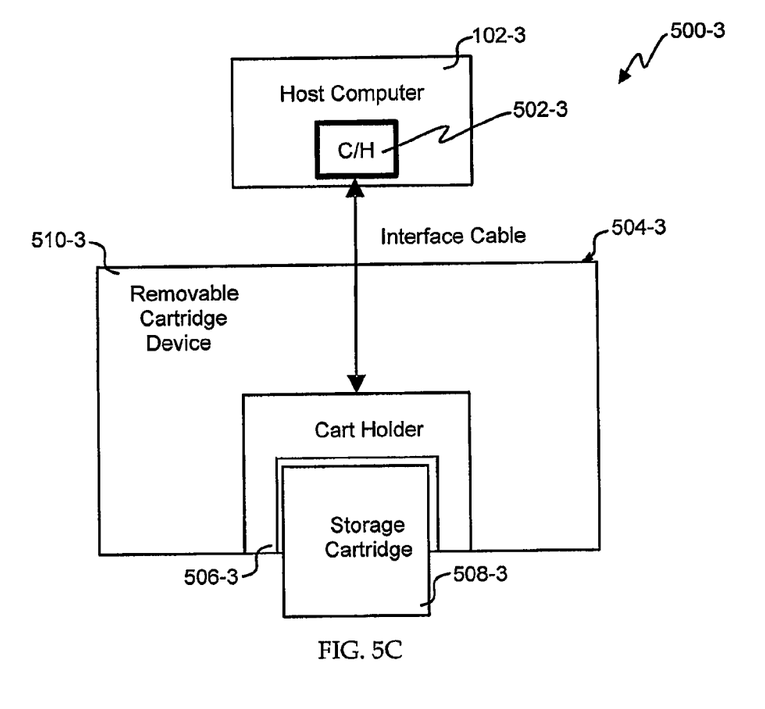

Referring next to FIG. 5C, a schematic diagram of an embodiment of a data storage system 500-3 for performing commonality factoring with a storage cartridge is shown. In this embodiment, the commonality factoring is implemented as an expansion card 502-3 within the host computer 102-3. The host computer 102-3 includes an expansion bus, which is coupled to the host computer's processor. The expansion card may be plugged into the computer expansion bus (e.g., PCI, ISA, AGP bus) in various embodiments. The implementation of commonality factoring on the expansion card may be accomplished through use of hardware and/or software. Once commonality factoring is performed on the data by the chunking and hashing modules 502-3 in the host computer 102-3, the de-duplicated data can be sent to the cartridge holder 506-3 and then to the storage cartridge 508-3 via the standard interfaces.

Figure 6:
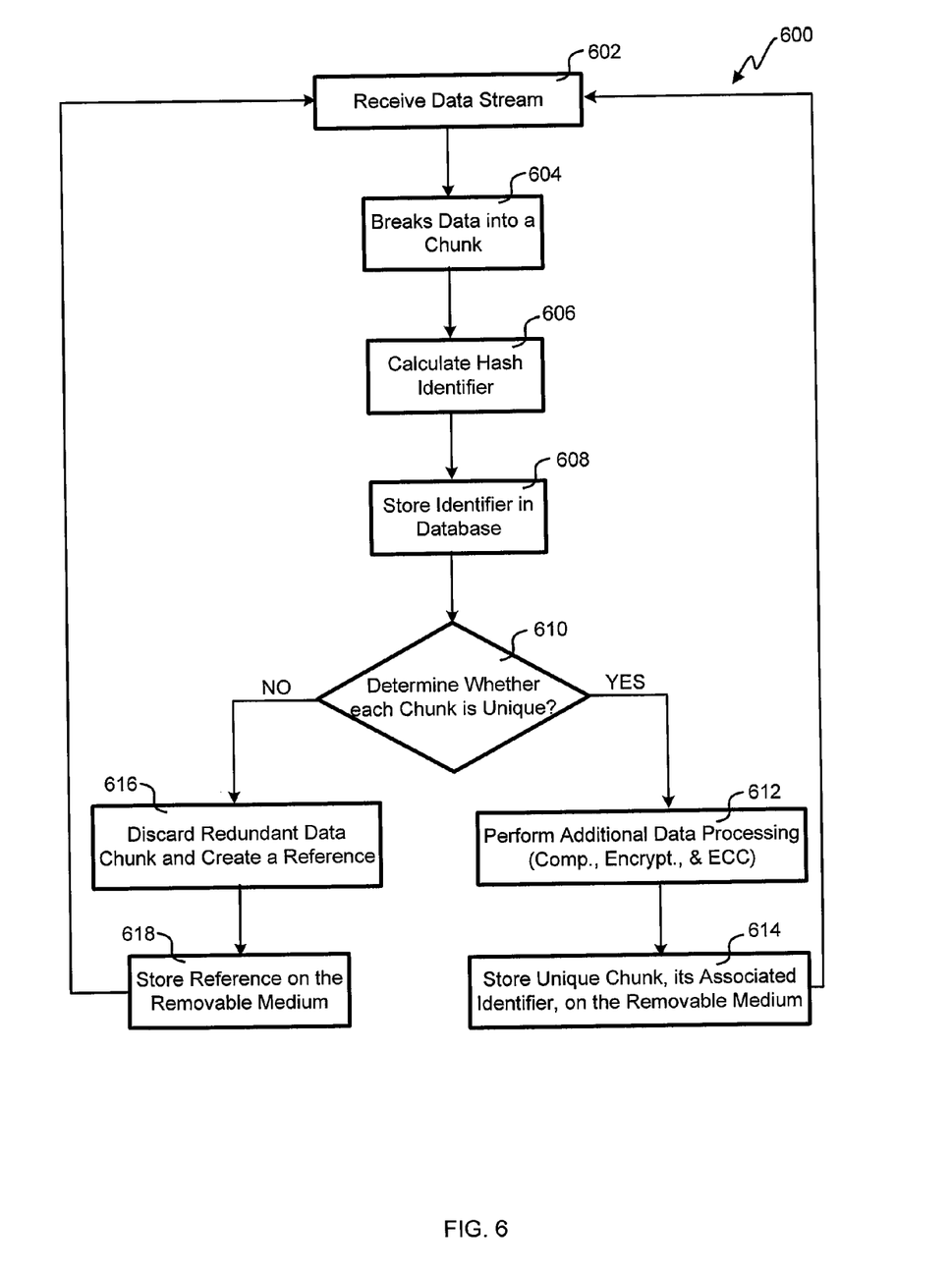
FIG. 6 illustrates a flowchart of an example of a process for storing data on a removable data cartridge.

Referring next to FIG. 6, an embodiment of a process 600 for storing data on a removable storage cartridge 108 is shown. The depicted portion of the process 600 begins in block 602 where an original data stream is received from various sources depending on the location of the expansion module 502. For example, the expansion module 502 may receive the original data from the host computer 102, the removable cartridge device 510, the cartridge holder 506, or the storage cartridge 508 in various embodiments. The original data stream may comprise a plurality of files in some embodiments. In some embodiments, the stream is not divided into files in a way that is discernable.

The chunking module 202 is used at block 604 to break the data stream into a sequence of data chunks and creating an end-of-record (EOR) to define the chunk boundary. Once the chunking module 202 creates the chunks, processing continues to block 606 where the hashing module 204 calculates an identifier for each of the chunks. Different hash algorithms such as message digest algorithm (MD5), secure hash algorithm-1 (SHA-1), and secure hash algorithm-2 (SHA-2) may be used in various embodiments. The identifiers are then stored into an identifier database 406 at block 608.

A determination is made, at block 610 as to whether each chunk is unique in that the same chunk has not been found in the previous chunks. The hashing module 204 is used at block 610 to determine if each chunk is unique by searching the identifier database 406. Some embodiments may use a separate searching module 404 for determining the uniqueness of each chunk at the block 610. In this case, the searching module 404 performs a search of the identifier database 406 based on the output from the hash calculator 402 to determine if each chunk is unique. If the chunk is unique, processing flows from block 610 to optional block 612 to perform additional data processing such as compression, encryption, and error correction coding. The unique chunks and their associated identifiers are then stored on the removable medium at block 614. If the chunk is not unique, processing goes from block 610 to block 616 where the redundant data chunk is discarded and a reference to the existing unique chunk is created. The reference to the existing unique chunk is then forwarded to the removable medium for storage at block 618. The processing then goes back to block 602 for performing the commonality factoring.

While the principles of the disclosure have been described above in connection with specific apparatuses, it is to be clearly understood that this description is made only by way of example and not as limitation on the scope of the invention.

What is claimed is:

1. A system comprising:
   a processor for generating a data stream;
   a removable drive bay coupled to the processor, the removable drive bay having a cartridge holder configured to accept a removable storage cartridge;
   a chunking module configured to receive the data stream from the processor and to break the data stream into chunks at chunk boundaries; and
   a hash module coupled to the chunking module, the hash module configured to determine whether each of the chunks is unique and to store chunks determined to be unique on the removable storage cartridge;
   wherein the data stream is split across multiple instances at truncation points that do not necessarily align with the chunk boundaries, the truncation points generating multiple data paths in parallel.

2. A system according to claim 1, wherein a first byte of each chunk is processed by the hashing module before a last byte of the chunk has been processed by the chunking module.

3. A system according to claim 1, wherein the data stream comprises a plurality of files.

4. A system according to claim 1, wherein the hashing module is further configured to calculate an identifier for each chunk, determine whether each chunk is unique based on the identifier, and store the identifier for each of the chunks determined to be unique.

5. A system according to claim 4, further comprising a search module configured to identify unique chunks based the identifiers stored by the hashing module, and for forwarding the unique chunks to one or more of a data compression module, an encryption module and an error correction coding module.

6. A system according to claim 1, wherein the hashing module and the chunking module are coupled in a pipeline architecture such that output from the chunking module comprises input to the hashing module.

7. A system according to claim 1, wherein the data stream is split across multiple instances of the chunking module to generate the multiple data paths in parallel.

8. A system according to claim 1, wherein the removable storage cartridge comprises a removable tape cartridge.

9. A system according to claim 1, wherein the truncation points create false chunk boundaries in the data stream, such that the multiple data paths are generated with truncation portions having a fixed size.

10. A system according to claim 1, wherein the hashing module is configured to use one or more of Message Digest Algorithm 5 (MD5) hashing, Secure Hash Algorithm-1 (SHA-1) hashing and Secure Hash Algorithm-2 (SHA-2) hashing.

11. A method comprising:
    providing an original data stream;
    splitting the original data stream across multiple instances to generate multiple data paths in parallel;
    receiving the original data stream by a chunking module in a pipeline architecture with a hashing module;
    breaking the original data stream into a plurality of chunks at chunk boundaries defined by the chunking module;
    determining whether each chunk is unique based on identifiers calculated by the hash module; and
    storing the chunks determined to be unique on a removable storage cartridge;
    wherein splitting the original data stream comprises truncating the original data stream at truncation points that do not necessarily align with the chunk boundaries, the truncation points creating false chunk boundaries in the data stream.

12. A method according to claim 11, wherein the original data stream is split across multiple instances of the chunking module in the pipeline architecture with the hashing module, the multiple data paths being mapped to the multiple instances in parallel.

13. A method according to claim 11, wherein the original data stream is generated with a host computer and received by the chunking module in a pipeline configuration external to the host computer.

14. An expansion card comprising:
    a chunking module for receiving a data stream from a host computer coupled to the expansion card, the chunking module configured to break the data stream into chunks by defining chunk boundaries; and
    a hashing module coupled to the chunking module in a pipeline fashion, the hashing module configured to receive the chunks from the chunking module, calculate an identifier for each chunk, determine whether the chunks are unique based on the identifier, and store chunks determined to be unique on a removable storage cartridge;
    wherein the data stream is split across multiple instances to generate multiple data paths in parallel; and
    wherein the data stream is split at truncation points that do not necessarily align with chunk boundaries.

15. An expansion card according to claim 14, wherein the data stream comprises a plurality of files and the truncation points creating false chunk boundaries in the plurality of files comprising the data stream.

16. An expansion card according to claim 14, wherein the data stream is split across multiple instances of the chunking module in the pipeline architecture with the hashing module, the multiple data paths being mapped to the multiple instances in parallel.

17. An expansion card according to claim 14, wherein a first byte of each chunk is processed by the hashing module before a last byte of the chunk has been processed by the chunking module.

18. An expansion card according to claim 14, further comprising a search module configured to identify unique chunks based on the identifiers calculated by the hashing module, and for forwarding the unique chunks to one or more of a data compression module, an encryption module and an error correction coding module.

19. An expansion card according to claim 14, further comprising a drive bay configured to accept the removable storage cartridge.

20. An expansion card according to claim 19, wherein the drive bay is configured to accept a removable tape cartridge.

* * * * *